Sept. 2, 1930.  J. MALONE  1,774,803
PASSENGER CAR
Filed Feb. 4, 1929  2 Sheets-Sheet 1
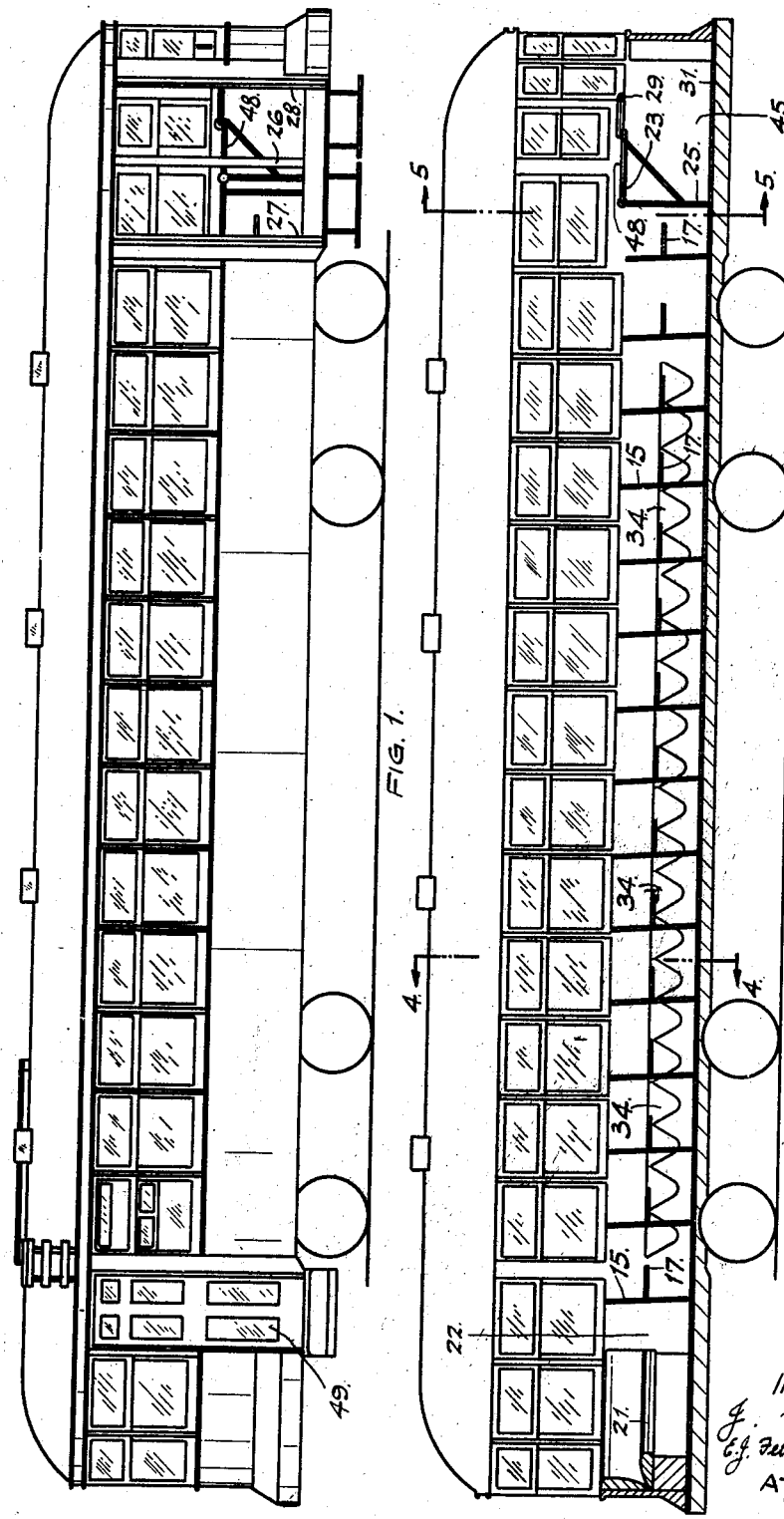

Sept. 2, 1930.  J. MALONE  1,774,803
PASSENGER CAR
Filed Feb. 4, 1929  2 Sheets-Sheet 2
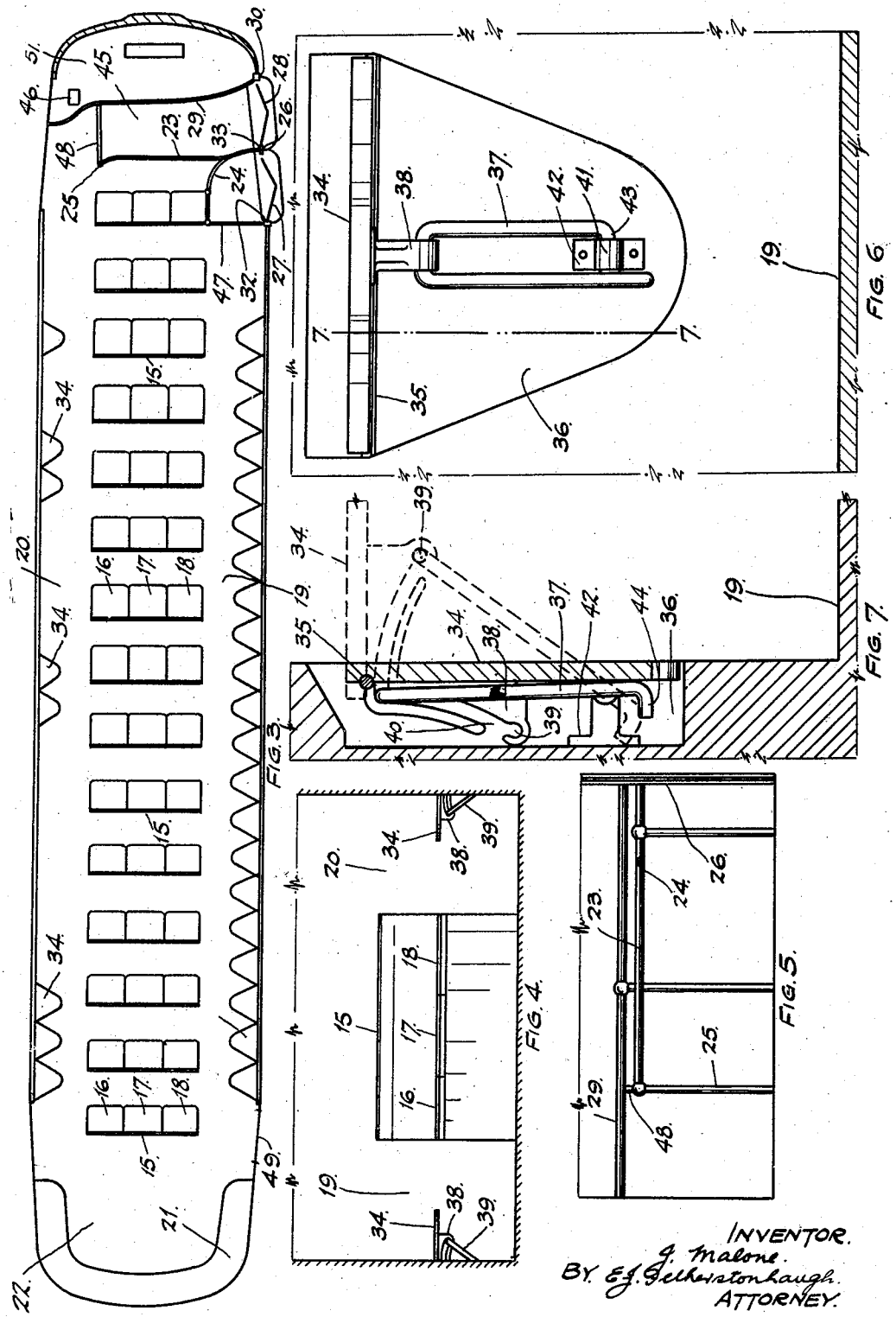
INVENTOR.
J. Malone.
BY E.J. Fetherstonhaugh.
ATTORNEY.

Patented Sept. 2, 1930

1,774,803

UNITED STATES PATENT OFFICE

JOHN MALONE, OF LONGUEUIL, QUEBEC, CANADA

PASSENGER CAR

Application filed February 4, 1929. Serial No. 337,301.

The invention relates to a passenger car, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to facilitate the admission to and the exit from passenger cars, particularly those cars used on electric railways and other transportation vehicles in city and suburban traffic, and thereby avoid overcrowding, both in loading and unloading the cars, and also materially assist tramway companies in collecting the fares as well as insuring the greatest of comfort for the passengers; to maintain a steady flow of traffic in large cities at rush hours, so that the other vehicular traffic is not unnecessarily delayed; to facilitate the handling of electrically driven vehicles by one man, so that in addition to operating the car he can readily attend to the collection of fares and the making of change and at the same time be master of the situation regarding his car, and its occupants; to introduce into passenger cars, a one way system, thus keeping the movement of the passengers always in a circuit, long or short, that is to say, to the full extent of the length of the car or cut across part way, and in this connection it may be stated that there will be no crowding from persons moving in opposite directions and therefore no obstruction to the entrance of the passengers or to their discharge; to utilize the space for seating and for standing to the best advantage and to furnish seats for aisle passengers; to construct a car having these advantages in a simple and economical manner; and generally to provide an efficient, durable and comfortable car for passengers at a moderate cost to the transportation companies, both as to its production and as to its maintenance on the road.

In the drawings, Figure 1 is a side elevational view of the car showing the entrance and exit doors in their open positions.

Figure 2 is a longitudinal sectional view of the car.

Figure 3 is a plan view of the interior of the car showing the seating and standing accommodation and the one way passages.

Figure 4 is a cross sectional view on the line 4—4 of Figure 2.

Figure 5 is a cross sectional view on the line 5—5 of Figure 2.

Figure 6 is a front elevational view of the aisle seat.

Figure 7 is a vertical sectional view of the aisle seat, on the line 7—7 in Figure 6.

Like numerals of reference indicate corresponding parts in the various figures.

This passenger car is on the plan of "pay as you leave" car, but as such "pay as you leave" cars have been put in use in some of the tramway lines, there is the same trouble as in the "pay as you enter" cars, a crowding up of the doorway, and it does not appear that anyone has combined the "pay as you leave" principle with the "one way direction" plan, and this invention resides in the means taken to introduce this system and the various constructional details included in the working out of the plans.

Referring to the drawings, the floor plan of the car is shown as having transverse rows of seats, indicated by the numeral 15.

Each row comprises three seats 16, 17 and 18 or as many as may be found desirable, and each seat is hinged to turn up individually to facilitate the passage of a passenger through the seats, that is to say, presuming there are one or two seats in a row, and a third person wishes to pass from the entrance aisle 19 to the exit aisle 20, then the two persons in the seat will stand up to make room for the third person to pass.

The several sets of seats comprising the rows are ranged along for the greater part of the length of the car, the last row terminating in front of a rear seat 21, which extends around the sides and back of the car, leaving a rotunda 22 or standing place to facilitate the passage of persons around the back of the middle seats from the entrance aisle to the exit aisle and also to leave some free standing room and generally to relieve congestion in the car.

The front row of middle seats is adjacent to the guard rail 23 and is connected to this guard rail on the entrance side by the fend rail 24, these two rails being supported by posts, to form a barrier, not readily passable.

The guard rail 23 begins at the post 25, which is in front of and in line with the inner end of the front row of middle seats, and this guard rail 23 extends from the post 25 to the outer post 26, which is between the entrance door 27 and the exit door 28.

The guard rail 29 extends from the post 30 at the front side of the door 28, completely across the vestibule 31 of the car, and is supported by a post, and forming a fence to enclose the motorman of the car, who in this case is also the conductor.

The doors 27 and 28 are so hinged at 32 and 33 respectively, and may be so arranged if desired as to cause the door 27 to open inwardly and the door 28, that is to say, the exit door to open outwardly, but this is not essential, as the regular folding doors as at present used in tramcars will be found quite suitable so long as they are under the control of the motorman.

The aisle seats 34 are preferably flush with the wall as there is very little room to spare and it is better that these aisle seats should shut right into the wall when they are closed as to be almost concealed.

These aisle seats preferably taper outwardly so as to leave room for the legs when passengers prefer to stand to allow others to pass them, so by having these seats the passenger can stand up close to the wall, and thus afford plenty of passage room for the other person. While the car is in motion and while no one is passing instead of hanging on to a strap or to a rod the passenger can comfortably sit down without discommoding anyone.

These seats 34 are hinged at 35 in the recesses 36 and each seat carries a strut 37 in loop form, this strut at its upper end being slidably arranged in a bracket 38 having the locking notch 39 at the outer end of an arcuate slot 40, the said looped form of strut 37 swinging from the eye 41 formed by the strap 42 rigidly secured to the wall of the car in each recess 36, one leg of the loop being offset at 43 and inserted in said eye 41, while the other leg of the loop extends downwardly beyond the eye and is offset at 44 to form a stop against the wall of the car, thus each seat for closing down or lifting up is slightly raised to clear the strut of the notch 39 and once it is clear the seat may be readily pushed upwardly or allowed to drop so long as the strut has cleared the centre of the arcuate slot 40.

This is a very simple arrangement for the aisle seats and as they are very important to this construction the mechanism of operating the same must be proof against misunderstanding by the public.

In the operation of this invention the passengers enter by the door 27, which is the rear door of the pair of doors at the vestibule end of the car.

The passenger entering through the doorway, closed by the door 27 follows along the entrance aisle 19 and may find a seat in any one of the middle rows of seats, or if they are full, the passenger can continue on to the end and get a seat at the rear, but if the car is very crowded, he can take any seat along the aisle, these are just short seats and are not intended to afford the same comfort as the middle seats or the rear seat, but at the same time they provide very good seating accommodation and save the passenger from being knocked about during the journey.

There is only one direction for the passenger to move in, that is, whoever it may be, enters by the door 27 and the next object is to reach the exit door 28, of course if the passenger is seated in the front row of the middle seats, then he is right at hand, still one direction, and yet it remains one direction if he carries on to the end of the car in the entrance aisle and crosses behind the middle seats to the exit aisle, it is always reaching the exit door by continuing in one way, this way being across through any of the middle seats to the exit aisle or across behind the middle seats to the exit aisle.

The passenger from the exit aisle crosses the car in front of the guard rail 23 and to the rear of the guard rail 29, these two guard rails forming a discharge passage, indicated by the numeral 45, but the passenger cannot escape the motorman for this passage is of the requisite width to prevent crowding past one another, besides the door is always within the control of the motorman and he can control it at any time should a passenger be unruly, and as a passenger leaves the car, a ticket is dropped into the ticket receptacle 46 or a coin or other token constituting the fare.

The entrance aisle 19 and the discharge passage 45 are further safeguarded by the one way doors or barriers 47 and 48, the door 47 being across the entrance aisle 19 adjacent to the door 27, opening inwardly only, the door 48 being across the exit aisle from the guard rail 23 and opening outwardly only into the discharge passage 45, therefore it will be seen that there is only one way for the passengers to move in entering or leaving the car.

The passengers after they put their fare in are free to leave the car by the door, indicated by the exit door 28, therefore there cannot by any crowding, as the passengers leaving the car in no way interfere with the passengers entering the car, and because of this the officers of the tramway company are much facilitated in loading and unloading their cars, thus keeping the traffic moving.

The emergency door 49 is installed towards the rear of the car and is intended to open only on the application of considerable force or be under the control of the motorman or chauffeur.

What I claim is:—

1. In a passenger car, seating arranged in the body to form entrance and exit aisles and connecting passages contributing towards one way directions from adjacent entrance and exit openings and rows of contiguous aisle seats of tapering shape and recessed in the wall in their folded position.

2. In a passenger car, seating arranged in the body to form entrance and exit aisles and connecting passages contributing towards one way directions from adjacent entrance and exit openings, and rows of contiguous aisle seats hinged to the wall and having looped strut supports automatically adjustable in slotted brackets attached to the seats and forming stops abutting the wall.

3. A passenger car comprising running gear and a body having doors closing contiguous openings leading into and out of the car, central seating forming entrance and exit side aisles and standing room at the rear, a transverse guard rail extending from and separating said openings and terminating at said exit aisle and a branch guard rail leading from the aforesaid guard to the back of the front seat and barring the passage between said front seat and the transverse guard rail to the entrance opening and a vestibule guard rail extending across the car from the forward side of the exit opening and forming with the aforesaid transverse guard rail an egress passage beginning at the exit aisle in a "pay as you leave" car.

Signed at Montreal, Canada, this 3rd day of January, 1929.

JOHN MALONE.